(12) United States Patent
Fortier (10) Patent No.: US 8,077,824 B2
(45) Date of Patent: Dec. 13, 2011

(54) SUPPORT ARRANGEMENT

(75) Inventor: Fredrik Alfried Fortier, Karenpark (ZA)

(73) Assignee: Pebble Bed Modular Reactor (Proprietary) Limited, Centurion (ZA)

( * ) Notice: Subject to any disclaimer, the term of this patent is extended or adjusted under 35 U.S.C. 154(b) by 468 days.

(21) Appl. No.: 10/568,460

(22) PCT Filed: May 27, 2004

(86) PCT No.: PCT/IB2004/001738
§ 371 (c)(1),
(2), (4) Date: Oct. 3, 2006

(87) PCT Pub. No.: WO2005/017920
PCT Pub. Date: Feb. 24, 2005

(65) Prior Publication Data
US 2007/0076836 A1    Apr. 5, 2007

(30) Foreign Application Priority Data
Aug. 15, 2003  (ZA) .................................. 2003/6376

(51) Int. Cl.
*G21C 13/024* (2006.01)
*G21C 9/00* (2006.01)
*G21C 9/015* (2006.01)

(52) U.S. Cl. ..................... 376/461; 376/277; 376/302

(58) Field of Classification Search ............... 376/302, 376/461
See application file for complete search history.

(56) References Cited

U.S. PATENT DOCUMENTS

| 3,554,868 A | * | 1/1971 | Thorp, II ....................... 376/285 |
| 3,986,581 A | | 10/1976 | Caldwell |
| 4,008,757 A | | 2/1977 | Weatherford, Jr. |
| 4,379,119 A | | 4/1983 | Fujimoto |
| 5,459,768 A | * | 10/1995 | Stockhausen ................. 376/284 |
| 5,772,420 A | * | 6/1998 | Holmes .......................... 425/588 |

FOREIGN PATENT DOCUMENTS

| GB | 808739 | 2/1959 |
| GB | 889758 | 2/1962 |
| GB | 1080405 | 8/1967 |
| WO | WO 82/04092 | 11/1982 |

* cited by examiner

*Primary Examiner* — Johannes P Mondt
(74) *Attorney, Agent, or Firm* — Finnegan, Henderson, Farabow, Garrett & Dunner LLP (57) ABSTRACT

A nuclear reactor includes a reactor pressure vessel 12 and a core barrel 14, contained within the reactor pressure vessel 12. The reactor 10 further includes a single vertical support 16, for transmitting vertical load from the core barrel to the reactor pressure vessel. Further, lateral support means is provided at an elevation which is above that of the support 16 to provide lateral support to the core barrel 14. This arrangement will result in reduced stress arising from the temperature fluctuations.

22 Claims, 9 Drawing Sheets

SUPPORT ARRANGEMENT

CROSS REFERENCE TO RELATED APPLICATIONS

This application is an national phase application based on PCT/IB2004/001738, filed May 27, 2004, the content of which is incorporated herein by reference, and claims the right to priority based on South African Application No. 2003/6376, filed Aug. 15, 2003.

THIS INVENTION relates to a support arrangement. It also relates to a method of supporting a vessel.

A problem which is encountered is the support of vessels which are subjected to temperature fluctuations. As a result of changes in temperature the shape and/or dimensions of the vessel may change and this can lead to undesirable stresses in the vessel and/or in the vessel support. This is particularly the case when the change in temperature is uneven.

It is an object of this invention to provide means which the Inventor believes will at least alleviate this situation.

According to one aspect of the invention there is provided a support arrangement which includes
a vessel to be supported;
a single vertical support for supporting the weight of the vessel; and lateral support means at least at an elevation which is above that of the single vertical support for providing lateral support to the vessel The Inventor believes that the invention will find application particularly, though not necessarily exclusively, in a high temperature gas cooled nuclear reactor.

Accordingly the vessel may be a core barrel of a high temperature gas cooled nuclear reactor which includes a reactor pressure vessel within which the core barrel is housed, the vertical support including upper and lower support members which are connected respectively to the core barrel and the reactor pressure vessel, between which the vertical loads are transmitted.

The core barrel may be generally cylindrical in shape and has an axis which extends generally vertically, the upper and lower support members defining centrally positioned oppositely disposed contact surfaces.

At least one of the contact surfaces may be curved so that relative movement between the contact surfaces is achieved by rolling and not sliding thereby reducing wear and the risk of welding of the surfaces when operating in a helium environment. In a preferred embodiment of the invention both of the contact surfaces are curved.

The upper support member may define a downwardly facing concave contact surface. The lower support member may define an upwardly facing convex contact surface. The contact surfaces may be part spherical. In a preferred embodiment of the invention, the radius of the convex contact surface is smaller than that of the concave contact surface.

The vertical support may include an intermediate member interposed between the upper and lower support members. The intermediate member may define upper and lower contact surface which cooperate, respectively, with complementary contact surfaces of the upper and lower support members.

The contact surfaces of the intermediate member may be convex with the complementary contact surfaces of the upper and lower support members being concave. In a preferred embodiment of the invention, each convex contact surface has a radius which is smaller than that of the complementary concave contact surface.

The lateral support means may include a plurality of circumferentially spaced upper lateral supports positioned to support the core barrel laterally at or towards an operatively upper end thereof.

Each upper lateral support may include a set of inner and outer upper lateral support members connected to the core barrel and the reactor pressure vessel respectively, at least one of the inner and outer upper lateral support members of each set being mounted on a resiliently deformable support.

A roller element may be sandwiched between the inner and outer upper lateral support members of each upper lateral support to facilitate relative displacement between the inner and outer upper lateral support members and between the core barrel and the reactor pressure vessel to which they are connected. The roller and at least one of the inner and outer upper lateral support members may be provided with complementary teeth to ensure that relative displacement between the roller and complementary bearing surfaces of the inner and outer upper lateral support members is by rolling and not sliding.

In addition to the use of the rollers, the bearing surfaces may be treated to inhibit welding. This treatment may include nitriding of the bearing surfaces.

The bearing surfaces of the inner and outer upper lateral support members may be inclined. In particular, the bearing surfaces of the inner and outer upper lateral support members may be generally parallel and inclined outwardly upwardly.

Each outer upper lateral support member may be mounted on a resiliently deformable support which, in turn, is mounted on an upper support ring secured to the reactor pressure vessel. The resiliently deformable support may include a pair of support posts connected to the upper support ring at spaced apart positions and an elastically deformable guide beam which extends between the support posts and on which the outer upper lateral support member is mounted. The position of the guide beam may be adjustable thereby permitting the relative positions of the inner and outer upper lateral support members to be adjusted.

The lateral support means may include a plurality of circumferentially spaced lower lateral supports positioned to provide lateral support to the core barrel adjacent to a lower end thereof.

Each lower lateral support may include an elastically deformable locating element extending radially between inner and outer receiving formations to transmit lateral loads between the core barrel and the reactor pressure vessel.

The inner receiving formations may be provided on the upper support member and the outer receiving formations are protrusions which protrude radially inwardly from a lower support ring secured to the reactor pressure vessel.

The support arrangement may include auxiliary support means for supporting the core barrel within the reactor pressure vessel when subjected to exceptional loads, eg as a result of a seismic event.

In one embodiment of the invention, the upper support member includes a central member which extends downwardly from the bottom of the core barrel and a plurality of angularly spaced support beams connected to the bottom of the core barrel and to the central member and extending radially outwardly from the central member, the auxiliary support means including a lower auxiliary support including a plurality of circumferentially spaced radially inwardly facing slots in which radially outer ends of the support beams are receivable with little clearance.

The slots may be defined on a radially inner surface of a lower support ring secured to the reactor pressure vessel. Shims may be used to obtain the desired clearance of the ends of the beams in the slots.

In another embodiment of the invention, the upper support member includes a central member which extends downwardly from a bottom of the core barrel and a plurality of angularly spaced support beams connected to the bottom of the core barrel and to the central member and extending radially outwardly from the central member to an annular skirt which depends from the core barrel, the auxiliary support means including a lower auxiliary support which includes a plurality of circumferentially spaced protrusions which protrude radially inwardly from a lower support ring secured to the reactor pressure vessel and which are received with little clearance in complementary slots in the skirt Shims may be provided to obtain the desired clearance between the protrusions and the slots.

According to another aspect of the invention there is provided a method of supporting a vessel which includes the steps of transmitting the weight of the vessel with its contents to a support arrangement through a single vertical support; and supporting the vessel laterally at least at a position which is at an elevation above that of the vertical support.

When the vessel is in the form of a core barrel of a high temperature gas cooled nuclear reactor which includes a reactor pressure vessel within which the core barrel is supported, the method may include the steps of transmitting the weight of the core barrel and its contents to the reactor pressure vessel through a single vertical support; and transmitting lateral loads between the core barrel and the reactor pressure vessel through a lateral support positioned at an elevation above that of the vertical support.

The invention will now be described, by way of example, with reference to the accompanying diagrammatic drawings.

Figure 1:
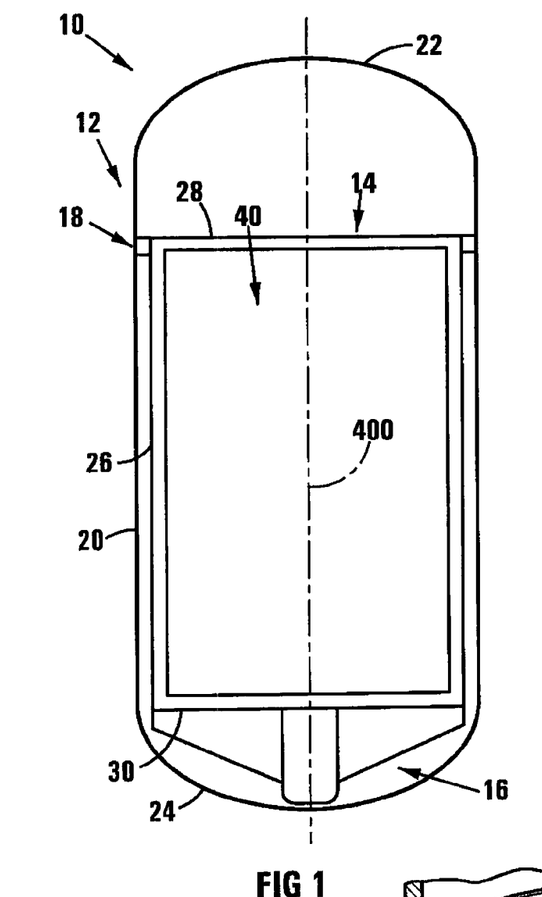
FIG. 1 shows a schematic layout of a nuclear reactor incorporating a support arrangement in accordance with the invention.

In the drawings, reference numeral 10 refers generally to a nuclear reactor incorporating a support arrangement in accordance with the invention. The reactor 10 includes a reactor pressure vessel 12 and a core barrel, generally indicated by reference numeral 14, contained within the reactor pressure vessel 12. The reactor 10 further includes a single vertical support, generally indicated by reference numeral 16, for transmitting vertical load from the core barrel to the reactor pressure vessel and lateral support means, generally indicated by reference numeral 18 (FIG. 7) for providing lateral support to the core barrel 14.

The reactor pressure vessel 12 comprises a circular cylindrical side wall 20 and domed upper and lower ends 22, 24 respectively.

The core barrel 14 includes a circular cylindrical side wall 26 having an axis 400 which extends vertically, a top 28 and a bottom 30. Positioned in the core barrel 14 are reflectors (not shown) which define between them a core or chamber 40 within which nuclear fuel is received.

The operational detail of the reactor and the associated structural features are not essential to the understanding of the invention and are not shown or described in detail.

Figure 2:
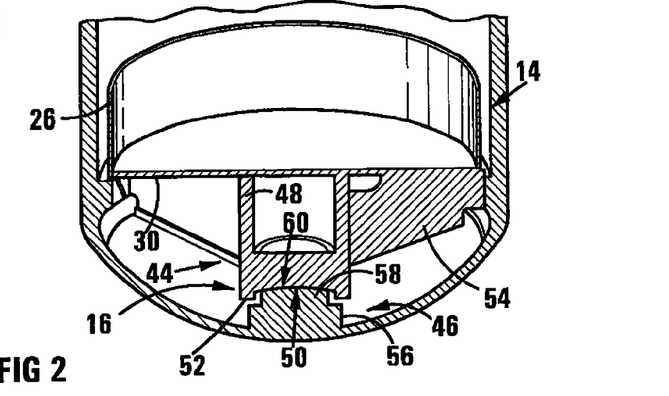
FIG. 2 shows a sectional view of a lower part of the nuclear reactor.
Figure 3:
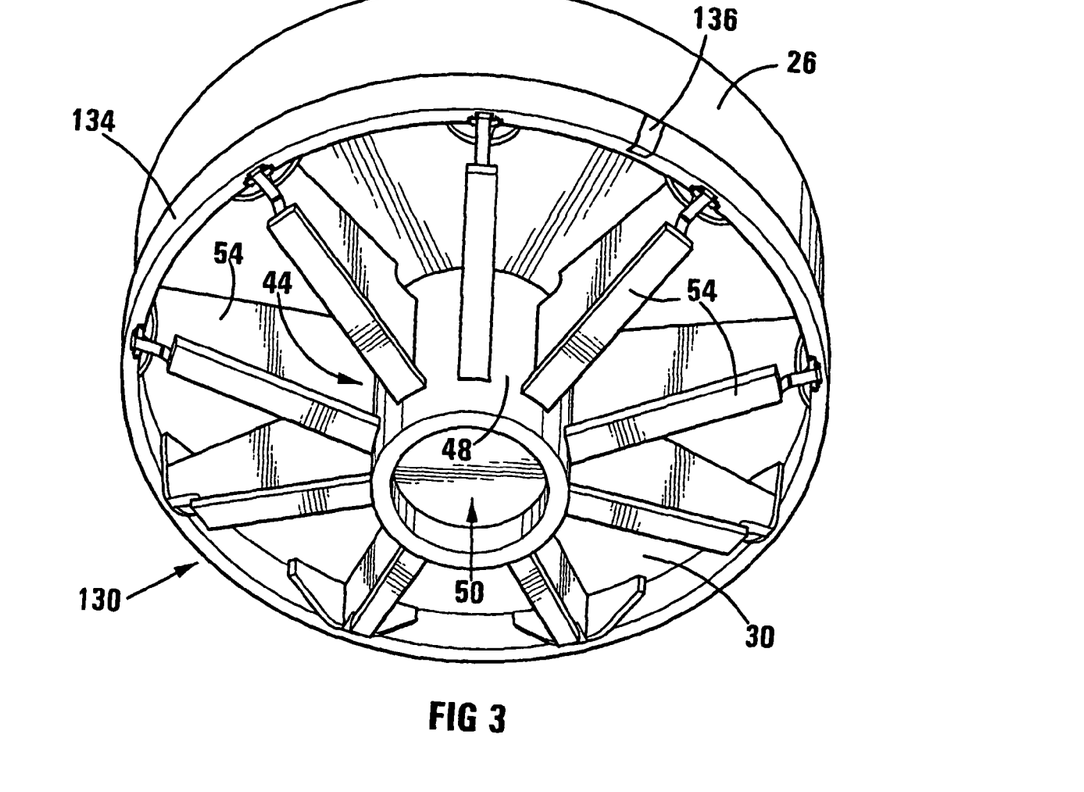
FIG. 3 shows a three-dimensional view from below of a lower end of the core barrel forming part of the nuclear reactor and illustrating part of a vertical support.
Figure 5:
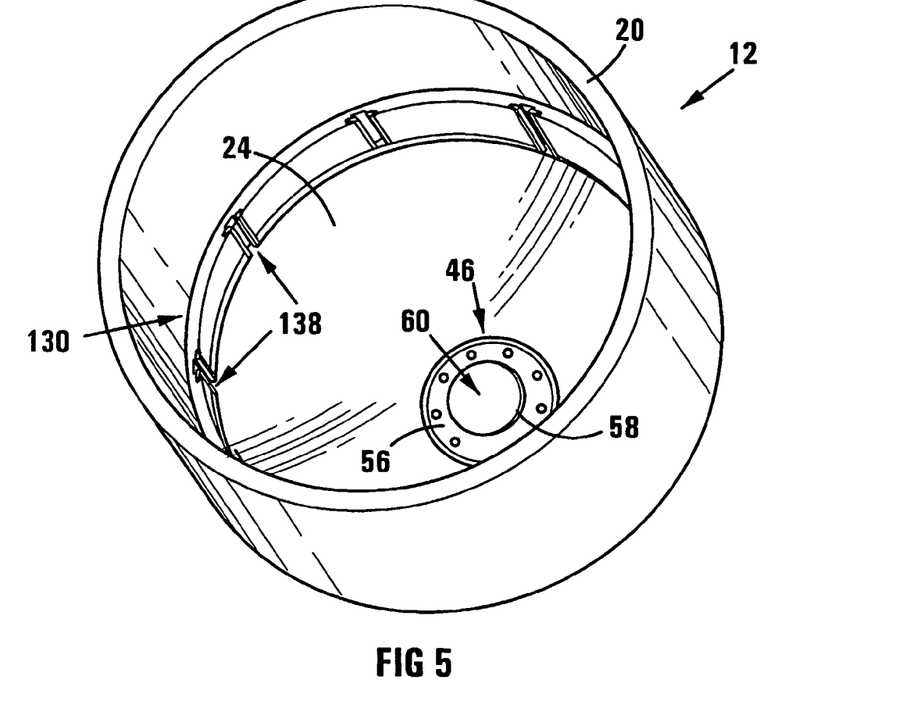
FIG. 5 shows a three-dimensional view of a lower portion of the reactor pressure vessel of the reactor illustrating the position of a lower support ring within the reactor pressure vessel.

Referring now in particular to FIGS. 2, 3 and 5 of the drawings, the vertical support 16 includes an upper support member 44 and a lower support member 46.

The upper support member 44 includes a circular cylindrical centre member 48 which is connected to the bottom 30 of the core barrel 14 and extends downwardly therefrom coaxially with the core barrel 14. The centre member 48 defines a downwardly facing concave contact surface 50. The contact surface 50 is recessed so that it is surrounded by an annular shoulder 52. The upper support member 44 further includes a plurality of angularly spaced support beams 54 connected to the bottom 30 of the core barrel 14 and to the central member 48 and extending radially outwardly therefrom. Hence, the support beams 54 provide support to the bottom 30 and to the central member 48 and serve to transfer the weight of the core barrel 14 to the central member 48.

The lower support member 46 as can best be seen in FIGS. 2 and 5 of the drawings, comprises a base 56 which is secured to the lower end 24 of the reactor pressure vessel 12 and a centrally disposed circular cylindrical portion 58 which protrudes upwardly from the base and defines a convex contact surface 60. The support member 46 is bolted to the reactor pressure vessel. These bolts do not have very large loads in view of the fact that it is the weight of the core barrel assembly which is transmitted through the vertical support 16 and the load is hence in a vertical downward direction. The diameter of the protruding portion 58 is smaller than the internal diameter of the annular shoulder 52 such that it is receivable therein with clearance. Further, the contact surface 50 has a radius of curvature which is larger than that of the contact surface 60. In one embodiment of the invention, the contact surface 50 has a radius of 5250 mm and the contact surface 60 has a radius of 4400 mm. Naturally, however, these radii may vary depending on the dimensions of the reactor and the optimum for a particular application can be determined by routine experimentation or empirical means. The curved surfaces are provided in order to ensure that relative movement occurs by rolling and not sliding. In addition, the relatively large radii are used in order to achieve a desired contact area.

Figure 7:
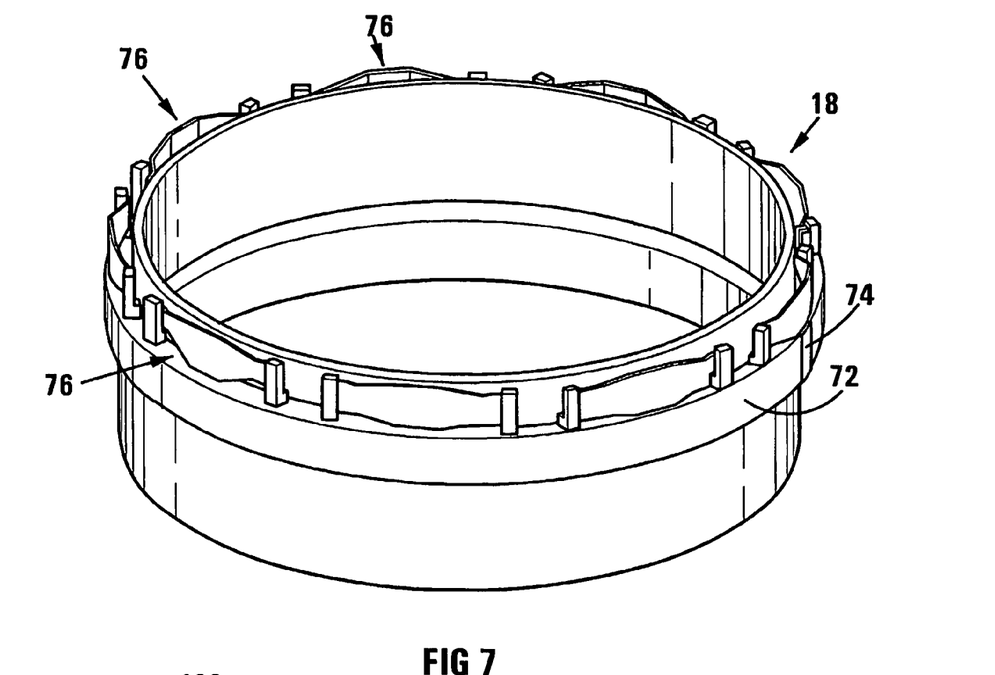
FIG. 7 shows a three-dimensional view of an upper end of the core barrel.
Figure 8:
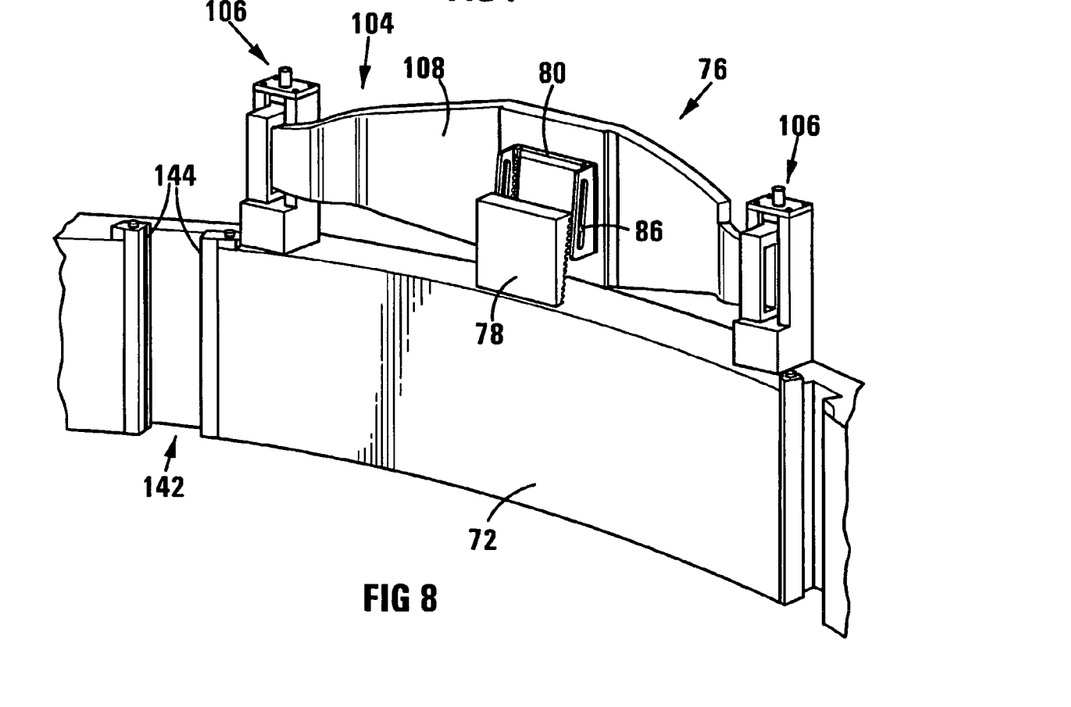
FIG. 8 shows a three-dimensional view of part of an upper support ring which is mounted on the reactor pressure vessel.
Figure 12:
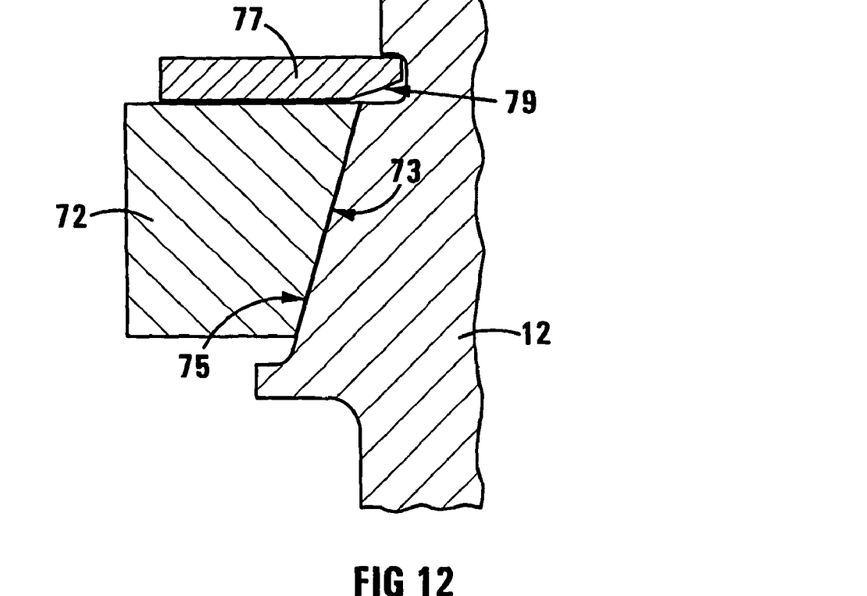
FIG. 12 shows, on an enlarged scale, a sectional view of part of the reactor pressure vessel and an upper ring forming part of the support arrangement.

As can best be seen in FIGS. 7, 8 and 12 of the drawings, an upper ring 72 is secured in position in the reactor pressure vessel 12. In this regard, one or more torsion keys 74 may be used to secure the ring 72 in position. As can most clearly be seen in FIG. 12 of the drawings, the ring 72 and pressure vessel 12 are provided with complementary downwardly radially inwardly tapering surfaces 73, 75. In addition, an annular locking plate 77 is secured to the support ring 72 by welding or bolts, a radially outer edge portion of the locking plate 77 being received in an annular recess 79 in the reactor vessel 12. This arrangement serves to lock the ring 72 in position without the need for welding to the surface of the reactor pressure vessel 12.

Figure 9:
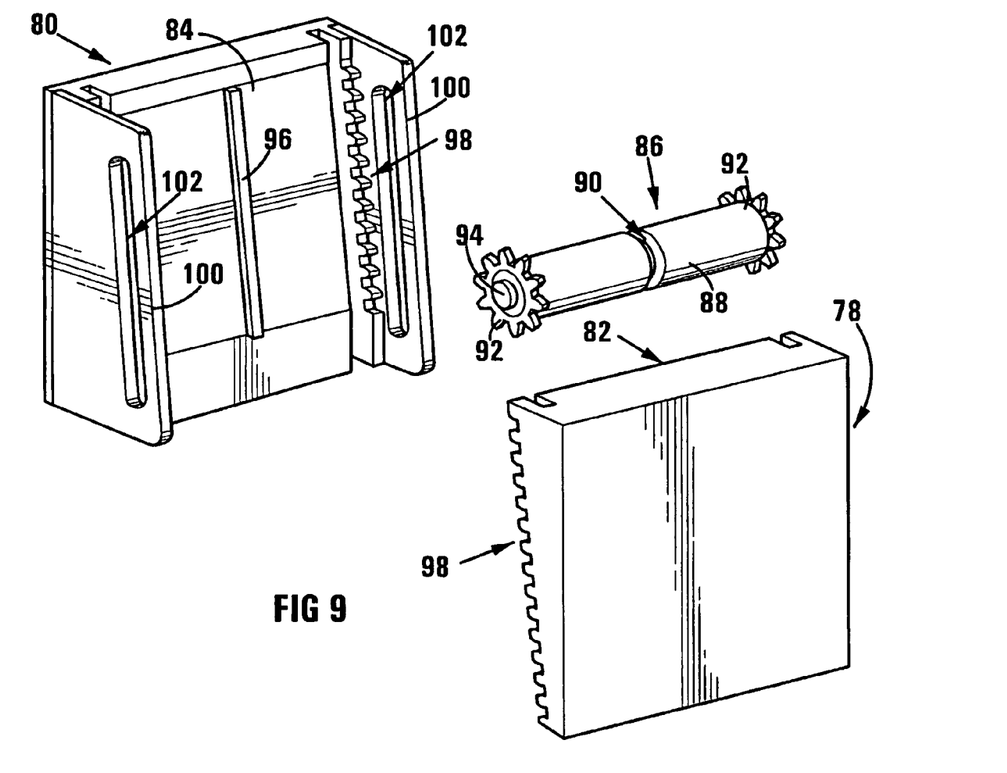
FIG. 9 shows a three-dimensional exploded view of part of an upper lateral support in accordance with the invention.

The lateral support means 18 includes a plurality of circumferentially spaced upper lateral supports 76 positioned to support the core barrel 14 at or towards an operatively upper end thereof. With reference also to FIG. 9 of the drawings, each upper lateral support 76 includes an inner upper lateral support member 78 and an outer upper lateral support member 80. The inner upper lateral support members 78 are secured to the core barrel 14 and the outer upper lateral support members 80 are connected to the upper ring 72 as described in more detail herebelow. The upper lateral support members 78, 80 define complementary inclined support or bearing surfaces 82, 84 which bear against a roller 86 positioned between the support members 78, 80. The roller 86 includes a circular cylindrical body 88 having a centrally disposed annular recess 90 therein. Further, a gear wheel 92 is provided at each end of the body and a circular cylindrical axial projection 94 projects from each of the gear wheels 92. Each of the inner and outer upper lateral support members 78, 80 is provided with a centrally disposed rib 96 which protrudes from the surfaces 82, 84 and is receivable in the recess 90. Further, on each side of each of the surfaces 82, 84 a set of gear teeth 98 complementary to those of the gear wheels 92 is provided. This arrangement serves to ensure that relative displacement of the inner lateral support member 78 and outer lateral support member 80 is achieved as a result of rolling of the roller 86. Further, each outer lateral support member 80 has a pair of cheek plates 100 which has a slot 102 provided therein. The slots 102 are parallel with the surface 84. The projections 94 are received with little clearance in the slots 102 and serve to restrict the extent of the movement of the roller 86 relative to the outer upper lateral support member 80.

Each outer upper lateral support member 80 is mounted on a resiliently deformable support, generally indicated by reference numeral 104 (FIG. 8). Each support 104 includes a pair of guide posts 106 mounted on the upper ring 72 and an elastically deformable guide beam 108 which extends between the support posts 106.

Figure 10:
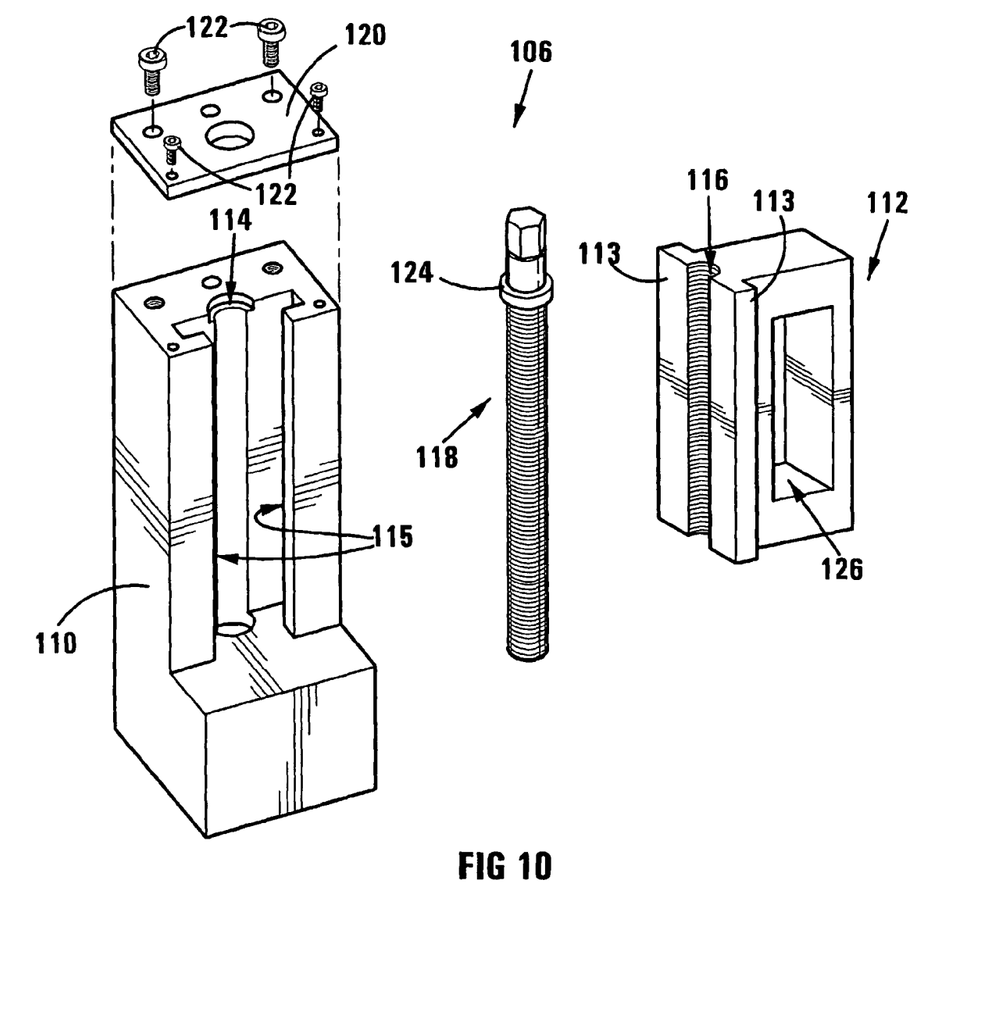
FIG. 10 shows a three-dimensional exploded view of a guide post mounted on the upper support ring.

As can best be seen in FIG. 10 of the drawings, each support post 106 includes a base 110 which is secured to the upper ring 72 by welding and a slider 112. The base 110 and slider 112 have complementary lip and channel formations 113, 115 which permit relative displacement of the slider 112 on the base 110 in a vertical direction. Complementary semicircular recesses 114, 116 are provided on the base 110 and the slider 112, respectively which together form a hole within which part of an adjusting screw 118 is positioned. The recess 116 is provided with a screw thread. Vertical displacement of the adjusting screw 118 is inhibited by a cover plate 120 which is mounted on the support base and held in position by screws 122. The cover plate 120 cooperates with a collar 124 on the adjusting screw 118 to inhibit vertical displacement of the adjusting screw 118. The cover plate 120 also serves to hold the slider 112 captive on the base 110 and permit a limited degree of vertical displacement of the slider 112 relative to the base 110 by rotation of the adjusting screw 118. The slider 112 defines a slot 126 within which an end portion of a guide beam 108 is receivable. The guide beam is accordingly supported on a pair of support posts 106 and is configured to permit a degree of resilient displacement of the guide beam 108, in the manner of a leaf spring, and hence the outer upper lateral support member 80 mounted thereon. Further, by adjusting the adjusting screws 118, the position of the guide beam and hence of the outer upper lateral support member 80 relative to the inner upper lateral support member 78 can be adjusted to obtain a desired preload. In the embodiment shown, the guide beams 108 are curved in order to fit within the space defined between the core barrel and the reactor pressure vessel.

Figure 11:
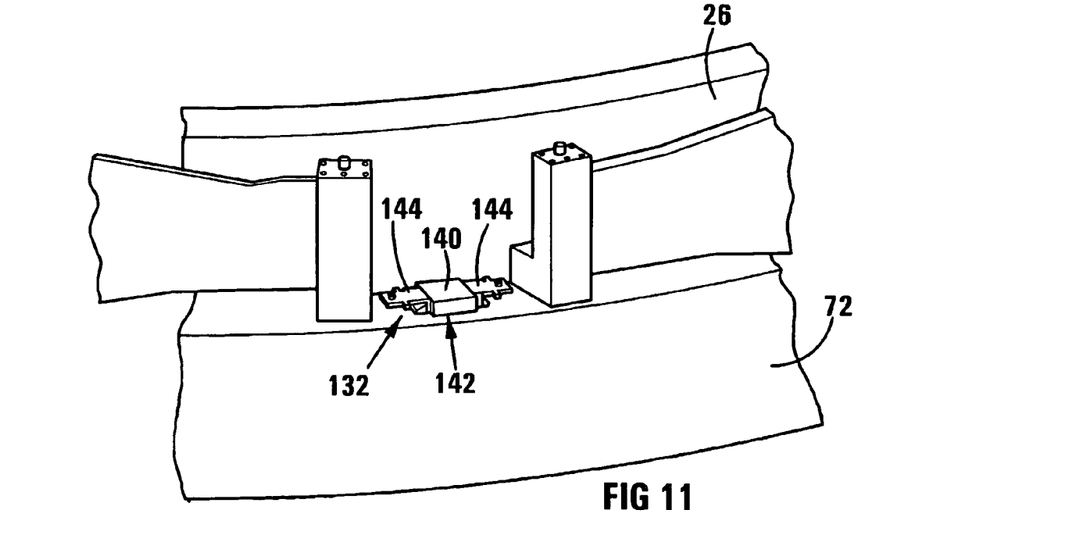
FIG. 11 shows a three-dimensional view of part of the upper auxiliary support.

As will be described in more detail herebelow, the vertical support 16 and lateral support means 18 serve to support the core barrel 14 within the reactor pressure vessel 12 under normal operating conditions. However, the possibility exists that the reactor 10 is subjected to exceptional loads, e.g. as a result of a seismic event. The reactor 10 accordingly includes auxiliary support means. The auxiliary support means includes a lower auxiliary support, generally indicated by reference numeral 130 (FIGS. 3 and 4) and an upper auxiliary support, generally indicated by reference numeral 132 (FIG. 11).

Figure 4:
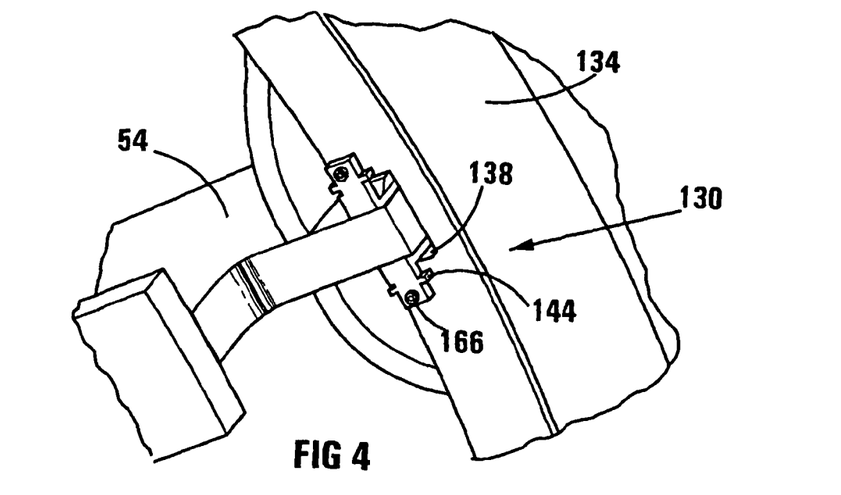
FIG. 4 shows, on an enlarged view, a three-dimensional view of part of a lower auxiliary support of the reactor.

The lower auxiliary support 130 includes a lower support ring 134 which is secured to the reactor pressure vessel 12 adjacent to a lower end of the core barrel 14. The lower support ring 134 may be secured in position in the reactor pressure vessel 12 in a similar fashion to the upper support ring 72 as described above. A plurality of radially inwardly open slots 138 is provided at circumferentially spaced positions on the lower support ring 134. Radially outer end portions of the support beams 54 are received within the slots 138.

The upper auxiliary support 132 includes a plurality of circumferentially spaced ribs 140 which are connected to and protrude outwardly from the side wall 26 of the core barrel 14. Complementary radially inwardly directed slots 142 are provided at circumferentially spaced positions on the upper support ring 72 within which slots portions of the ribs 140 are receivable.

Figure 6:
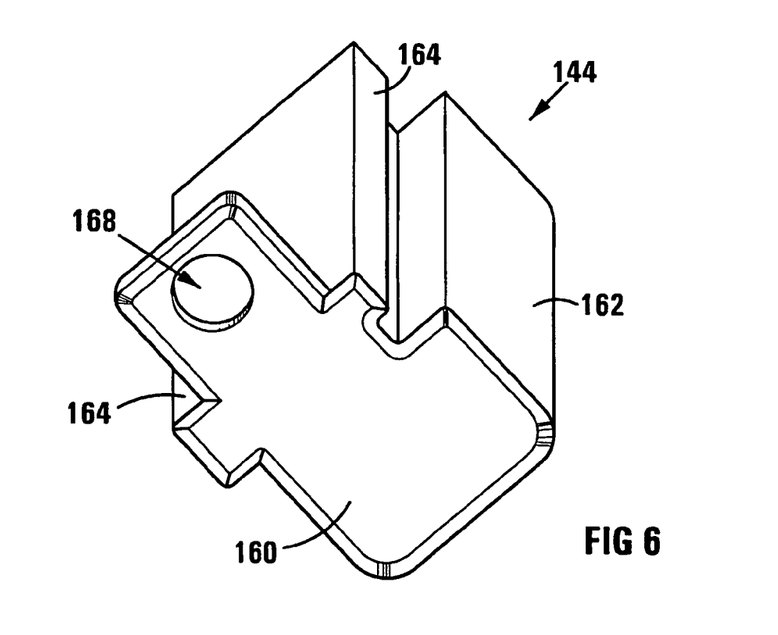
FIG. 6 shows a three-dimensional view of a shim mountable on the lower support ring.

It will be appreciated that, in normal use, there will be some relative movement between the core barrel 14 and the reactor pressure vessel 12, e.g. as a result of changes in temperature, differential rates of expansion and the like. The clearance between the support beams 54 and the lower support ring 134 and between the ribs 140 and the upper support ring 72 will be selected to permit this relative movement. In order to obtain the desired clearance in the slots 138, 142, use is made of shims 144, one of which is shown in FIG. 6 of the drawings. The shims are machined to the required dimensions and installed on the lower support ring 134 and upper support ring 72 to provide the desired clearance between the ends of the support beams 54 and the ribs 140, respectively. As can best be seen in FIG. 6 of the drawings, each shim 144 includes an end plate 160 and a body portion 162 protruding from the end plate 160. Oppositely disposed parallel ribs 164 protrude laterally outwardly from the body 162 and are slidably receivable in complementary vertically extending oppositely inwardly disposed channel formations in the support rings 72, 134. The shims are retained in this position by means of screws 166 which extend through complementary holes 168 in protruding portions of the end plates 160.

The core barrel typically has a length of about 22 meters and a circumference of about 18 meters. The core barrel heats up during operation and cools down during shut-down. In order to remain within the material temperature constraints, the core barrel has to be cooled down on the outside and to this end a core barrel cooling system is provided. However, it is unlikely that the core barrel sides will be at a uniform temperature all around the circumference at any given height. Variations in temperature can result from various factors such as an uneven flow of the core barrel cooling system gas around the circumference of the core barrel, an uneven gap between the side reflector and the core barrel sides, e.g. because of manufacturing tolerances, an uneven gap between the reactor pressure vessel and the core barrel due to manufacturing tolerances on both of these components, un-symmetrical placement of components such as inlet and outlet pipes, or the like. An uneven temperature distribution on the core barrel may result in some lateral deformation of the core barrel, e.g. slight bowing thereof. By supporting the weight of the core barrel on the single centrally disposed vertical support 16, the core barrel may bow without any exceptional stresses being induced in the core barrel or the support structure. This makes the core barrel insensitive to an uneven temperature distribution. A disadvantage with the prior art is that the core barrel is supported at a plurality of spaced apart vertical supports. As a result of movement of the core barrel uneven loading of the supports and hence of the core barrel can occur which can lead to undesirably high levels of stress. This problem is avoided by making use of the single centrally disposed vertical support 16.

Further, naturally, as a result of differences in temperature as well as the materials used, the rates and extent of the expansion of the core barrel and the reactor pressure vessel may differ. In this regard, the upper lateral support 76 serves to support the upper end of the core barrel. As the core barrel heats up, it expands both vertically and radially. This results in the inner upper lateral support members 78 being displaced upwardly and radially outwardly relative to the outer upper lateral support members 80. However, the inclination of the support surfaces 82, 84 permits this expansion and maintains the support surfaces in contact with the surface of the roller 86. The natural resilience of the guide beams 108 also permits a degree of lateral movement. If, for some reason, the surfaces 82, 84 lose contact with the roller 86, the roller will be held in position by means of the gear teeth 92, 98. Should the separation between the surfaces 82, 84 become even greater such that the teeth 92, 98 lose contact, then the roller will roll down the surface 84 until the projections 94 are positioned in the bottom of the slots 102. This ensures that the rollers 86 do not fall down between the reactor pressure vessel 12 and core barrel 14. The surfaces 82, 84 are typically inclined at an angle of about 10° to the vertical. However, it will be appreciated, that this angle may vary with the optimum for a particular application being determined by routine experimentation or empirically.

In the event of an unusual load being applied to the reactor 10, e.g. as a result of a seismic event, the single vertical support 16 will support the weight of the core barrel 14, however, the upper lateral supports 76 may be incapable of providing sufficient horizontal support to the core barrel 14 since the guide beams 108 will deform. If the deflection is sufficient, the gaps between the end portions of the support beams 54 and the slots 138 and between ribs 140 and the slots 142 will close thereby transmitting horizontal loads from the core barrel 14 to the reactor pressure vessel 12. After the seismic event, the guide beams 108 will centralize the core barrel 14 and open up the gaps between the ribs 140 and the slots 142. In this regard, it will be appreciated that the guide beams 108 are designed to handle this deformation and remain within the elastic region of the material from which they are manufactured.

Naturally, certain variations of the support arrangement are possible. For example, the lower support member 46 can be connected to the reactor pressure vessel by means of a configuration of beams designed to spread the load transmitted thereto by the core barrel over a larger area of the reactor pressure vessel.

Figure 13:
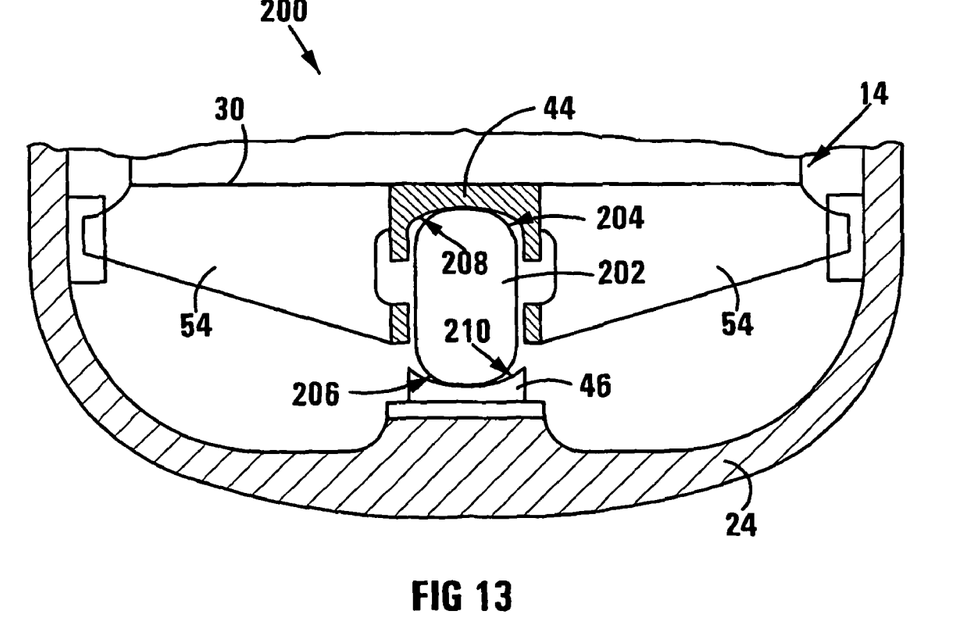
FIG. 13 shows a sectional elevation, similar to FIG. 2, of a lower part of another nuclear reactor incorporating another support arrangement in accordance with the invention.

Another variation of the support arrangement is illustrated in FIG. 13 of the drawings in which reference numeral 200 refers generally to part of another reactor incorporating a support arrangement in accordance with the invention and, unless otherwise indicated, the same reference numerals used above are used to designate similar parts.

The main difference between the support arrangement of the reactor 200 and that of the reactor 10 is that, in the case of the reactor 200 the support arrangement includes an intermediate member 202 disposed between the upper support member 44 and the lower support member 46. The intermediate member 202 is generally oval in shape having convex upper and lower contact surface 204, 206. The upper support member 44 and lower support member 46 have concave support surfaces 208, 210. The radii of the support surfaces 208, 210 are larger than those of the support surfaces 204, 206.

An advantage with this arrangement is that it is self-centering.

Figure 14:
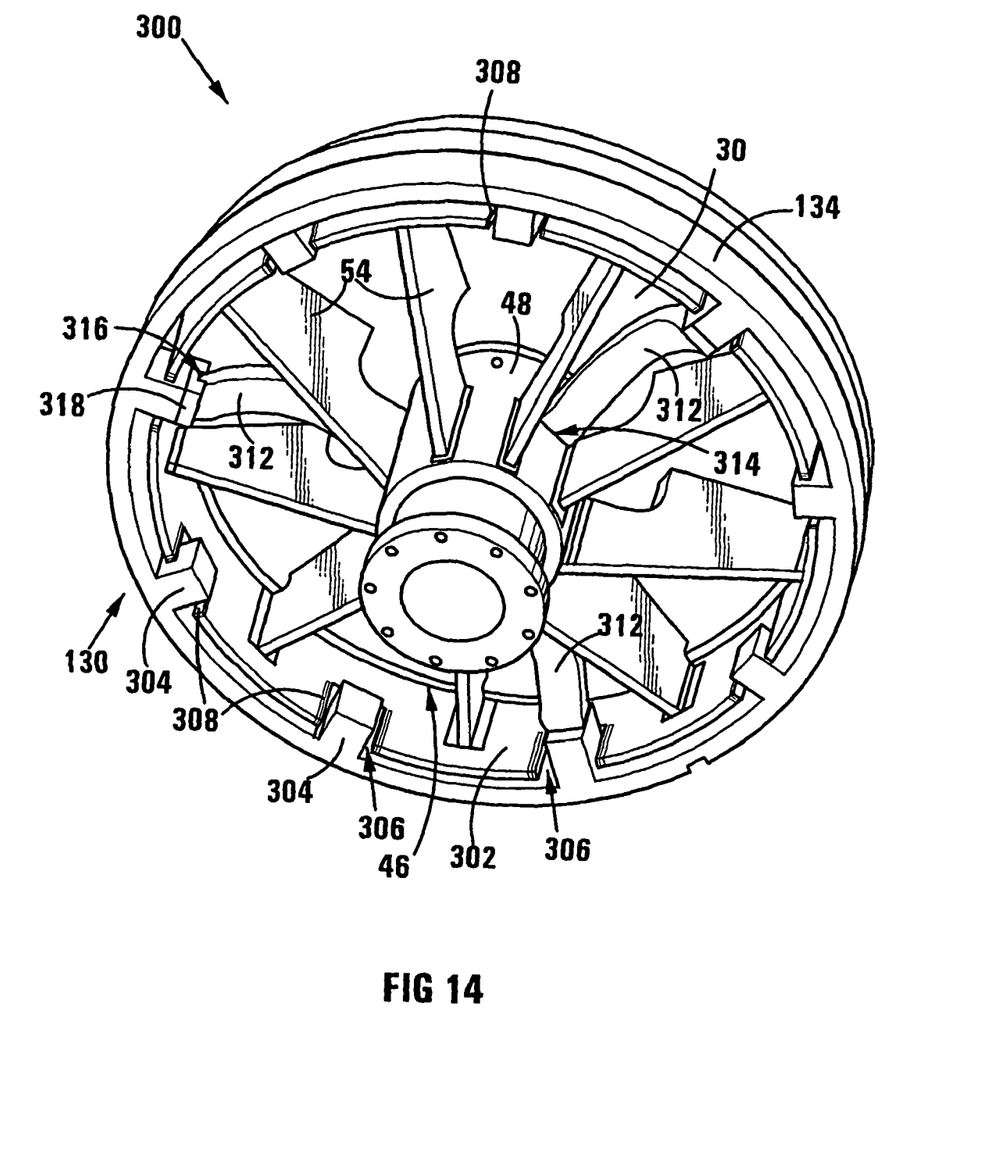
FIG. 14 shows a three-dimensional view similar to FIG. 3 of the drawings, of a lower end of a core barrel forming part of yet another nuclear reactor incorporating a support arrangement in accordance with the invention.
Figure 15:
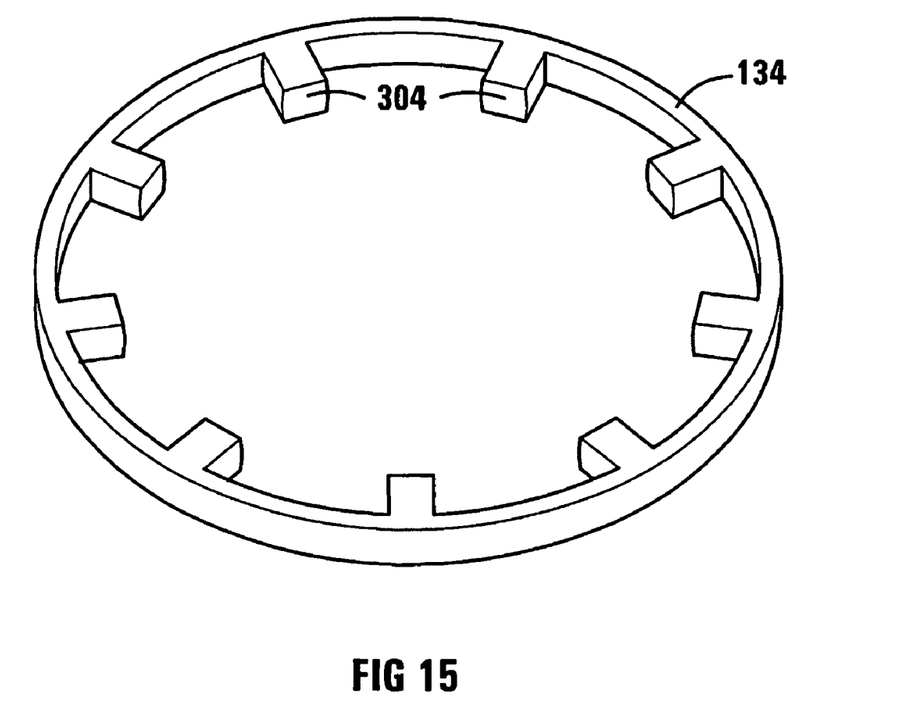
FIG. 15 shows a three-dimensional view of a lower support ring forming part of the support arrangement of the reactor of FIG. 14.
Figure 16:
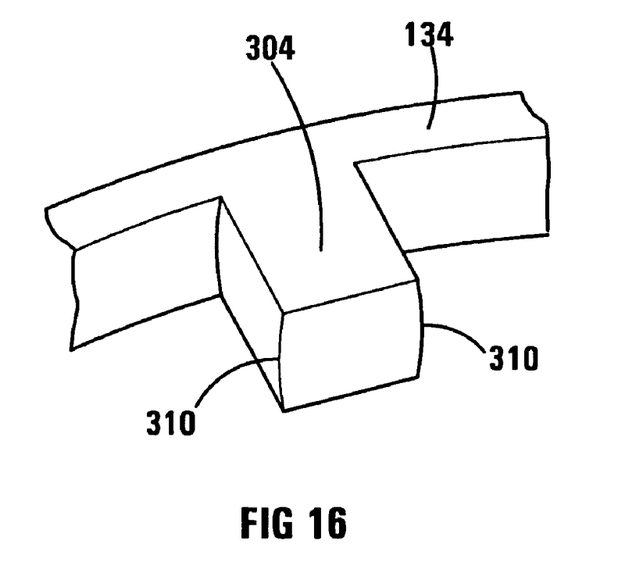
FIG. 16 shows a three-dimensional view, on an enlarged scale, of a protrusion protruding from the support ring of FIG. 15.

Reference is now made to FIGS. 14 to 16 of the drawings, in which reference numeral 300 refers generally to part of another reactor incorporating a support arrangement in accordance with the invention and, unless otherwise indicated, the same reference numerals used above are used to designate similar parts.

In this embodiment of the invention, an annular skirt 302 depends downwardly from the bottom 30 of the core barrel. The support beams 54 are connected to the bottom 30 of the core barrel 14 and to the central member 48 and extend radially outwardly therefrom, the radially outer ends of the support beams 54 being connected to the skirt 302.

In addition, a plurality of, in the embodiment shown nine, protrusions 304 protrude radially inwardly from the lower support ring 134. The protrusions 304 extend through slots 306 provided in the skirt 302. Hence, the skirt 302 and protrusions 304 function as the lower auxiliary support 130 to support the core barrel in the event of its being subjected to an exceptional load, such as may be experienced during a seismic event. In order to obtain the desired clearance between the protrusions 304 and the slots 306, shims 308 may be used. Further, as can best be seen in FIG. 16 of the drawings, each protrusion 304 has convex sides 310 which, in the event of a seismic occurrence, make contact with the shims 308. The convex side 310 ensure that low contact stresses occur even if the skirt 302 should form a slight angle with the horizontal, e.g. as a result of bowing of the core barrel.

In addition, in this embodiment of the invention, the lateral support means includes a lower lateral support comprising three elastically deformable locating elements or beams 312. Inner end portions of the beams 312 are located in inner receiving formations in the form of recesses 314 provided on the upper support member 48 and radially outer ends of the beams 312 are positioned in complementary recesses 316 provided on shims 318 mounted on three of the protrusions 304. The shims 318 are used to obtain a desired preload in the beams 312. The beams 312 are curved in order to obtain maximum deflection for minimum stresses in the beams during a seismic event, the beams 312 will deform sufficiently to permit the spaces between the protrusions 304 and shims 308 to close thereby transmitting transverse loads from the core barrel to the reactor pressure vessel. After the seismic event, the beams 312 will centralize the central member 48 and re-establish the gap between the protrusions 304 and the shims 308.

The Inventor believes that when compared with prior art systems, the current invention will result in lower stresses on a vessel which is subjected to temperature fluctuations as well as on the support structure. Further, in the specific case of a reactor it allows a small amount of bowing of the core barrel without an increase in stresses. The core barrel is able to tolerate an uneven temperature distribution. Further, the core barrel can expand radially relative to the reactor pressure vessel as well as axially. By permitting adjustment of the supports 104, the lateral support of the core barrel adjacent its upper end can be adjusted to make sure that the core barrel is self-aligning and stable. Further, the shims which are provided on the upper and lower support rings are sized during installation and thereby ensure that the desired spacing or tolerances are achieved.

The invention claimed is:

1. A support arrangement comprising:
a vessel in the form of a core barrel of a high temperature gas cooled reactor which is housed within a reactor pressure vessel, the core barrel including a circular cylindrical side wall having an axis which extends vertically, the core barrel further including a top and a bottom;
a single vertical support for supporting the weight of the core barrel, the vertical support including separate upper and lower support members which are connected respectively to the bottom of the core barrel and the reactor pressure vessel between which vertical loads are transmitted, the upper and lower support members being centrally positioned about the axis and displaceable relative to one another under normal operation of the reactor, the upper and lower support members defining respectively downwardly and upwardly disposed contact surfaces through which the vertical loads are transmitted; and
lateral support means configured to provide lateral support to the core barrel, the lateral support means including a plurality of circumferentially spaced upper lateral supports configured to provide lateral support to the core barrel at or towards the top of the core barrel, each of which includes a set of inner and outer upper lateral support members connected to the core barrel at or towards the top of the core barrel and the reactor pressure vessel, respectively, and a roller element having a circular cylindrical body and being sandwiched between oppositely disposed bearing surfaces of the inner and outer lateral support members, wherein the bearing surfaces of the inner and outer upper lateral support members face radially outwardly and inwardly, respectively, relative to the axis and are each inclined both upwardly and outwardly relative to the axis of the core barrel thereby permitting the inner lateral support members to be displaced upwardly and radially outwardly relative to the outer upper lateral support members while maintaining the bearing surfaces in contact with the roller element to compensate for thermal expansion of the core barrel.

2. A support arrangement comprising:
a vessel in the form of a core barrel of a high temperature gas cooled reactor which is housed within a reactor pressure vessel, the core barrel including a circular, cylindrical side wall having an axis which extends vertically, the core barrel further including a top and a bottom;
a single vertical support for supporting the weight of the core barrel, the vertical support including separate upper and lower support members which are connected respectively to the bottom of the core barrel and the reactor pressure vessel between which vertical loads are transmitted, the upper and lower support members being centrally positioned about the axis and displaceable relative to one another under normal operation of the reactor, the upper and lower support members defining respectively downwardly and upwardly disposed contact surfaces through which the vertical loads are transmitted; and
lateral support means configured to provide lateral support to the core barrel, the lateral support means including a plurality of circumferentially spaced upper lateral supports configured to provide lateral support to the core barrel at or towards the top of the core barrel, each of which includes a set of inner and outer upper lateral support members connected to the core barrel at or towards the top of the core barrel and the reactor pressure vessel, respectively, each outer upper lateral support member being mounted on a support structure within the pressure vessel, said support structure including a pair of support posts connected to an upper support ring secured to the reactor pressure vessel at spaced apart positions and a guide beam, wherein the guide beam is configured to deform elastically in the manner of a leaf spring, and wherein the outer upper lateral support member is configured to be mounted on the guide beam.

3. The support arrangement as claimed in claim 1, wherein at least one of the contact surfaces is curved so that relative movement between the contact surfaces is achieved by rolling.

4. The support arrangement as claimed in claim 3, wherein both of the contact surfaces are curved.

5. The support arrangement as claimed in claim 4, wherein the upper support member defines a downwardly facing concave contact surface, and the lower support member defines an upwardly facing convex contact surface.

6. The support arrangement as claimed in claim 5, wherein the radius of curvature the convex contact surface is smaller than the radius of curvature of the concave contact surface.

7. The support arrangement as claimed in claim 1, wherein the vertical support further includes an intermediate member interposed between the upper and lower support members.

8. The support arrangement as claimed in claim 7, wherein the intermediate member defines upper and lower contact surfaces which cooperate, respectively, with the downwardly and upwardly disposed contact surfaces of the upper and lower support members.

9. The support arrangement as claimed in claim 8, wherein the contact surfaces of the intermediate member are convex, and the downwardly and upwardly disposed contact surfaces of the upper and lower support members are concave.

10. The support arrangement as claimed in claim 9, wherein each convex contact surface has a radius of curvature which is smaller than a radius of curvature of the complementary concave contact surface of the upper and lower support members.

11. The support arrangement as claimed in claim 1, wherein the roller element and at least one of the inner and outer upper lateral support members are provided with complementary teeth such that relative displacement between the roller element and complementary bearing surfaces of the inner and outer upper lateral support members is by rolling.

12. The support arrangement as claimed in claim 1, wherein each outer upper lateral support member is mounted on a support which, in turn, is mounted on an upper support ring secured to the reactor pressure vessel.

13. The support arrangement as claimed in claim 12, in which the support includes a pair of support posts connected to the upper support ring at spaced apart positions and a guide beam which extends between the support posts and on which the outer upper lateral support member is mounted.

14. The support arrangement as claimed in claim 1, wherein the lateral support means further includes a plurality of circumferentially spaced lower lateral supports configured to provide lateral support to the core barrel adjacent a lower end thereof.

15. The support arrangement as claimed in claim 14, wherein each lower lateral support includes a locating member extending radially between inner and outer receiving formations, and wherein each locating member is configured to transmit lateral loads between the core barrel and the reactor pressure vessel.

16. The support arrangement as claimed in claim 15, wherein the inner receiving formations are provided on the upper support member and the outer receiving formations are protrusions which protrude radially inwardly from a lower support ring secured to the reactor pressure vessel.

17. The support arrangement as claimed in claim 1, further including an auxiliary support means for supporting the core barrel within the reactor pressure vessel when subjected to exceptional loads.

18. The support arrangement as claimed in claim 17, wherein the upper support member includes a central member which extends downwardly from the bottom of the core barrel and a plurality of angularly spaced support beams connected to the bottom of the core barrel and to the central member and extending radially outwardly from the central member, the auxiliary support means including a lower auxiliary support including a plurality of circumferentially spaced radially inwardly facing slots in which radially outer ends of the support beams are receivable with clearance.

19. The support arrangement as claimed in claim 18, wherein the slots are defined on a radially inner surface of a lower support ring secured to the reactor pressure vessel.

20. The support arrangement as claimed in claim 17, wherein the upper support member includes a central member which extends downwardly from the bottom of the core barrel and a plurality of angularly spaced support beams connected to the bottom of the core barrel and to the central member and extending radially outwardly from the central member to an annular skirt which depends from the core barrel, wherein the auxiliary support means includes a lower auxiliary support which includes a plurality of circumferentially spaced protrusions which protrude radially inwardly from a lower support ring secured to the reactor pressure vessel and which are received, with clearance, in complementary slots in the skirt.

21. The support arrangement as claimed in claim 17, wherein the auxiliary support means includes an upper auxiliary support comprising a plurality of circumferentially spaced ribs connected to and protruding outwardly from the core barrel and complementary slots provided in and opening out of a radial inner surface of an upper support ring, wherein end portions of the ribs are receivable within the slots with clearance.

22. The support arrangement as claimed in claim 2, in which the position of the guide beam is adjustable such that the relative positions of the inner and outer upper lateral support members are adjustable.

* * * * *